Figure 1:
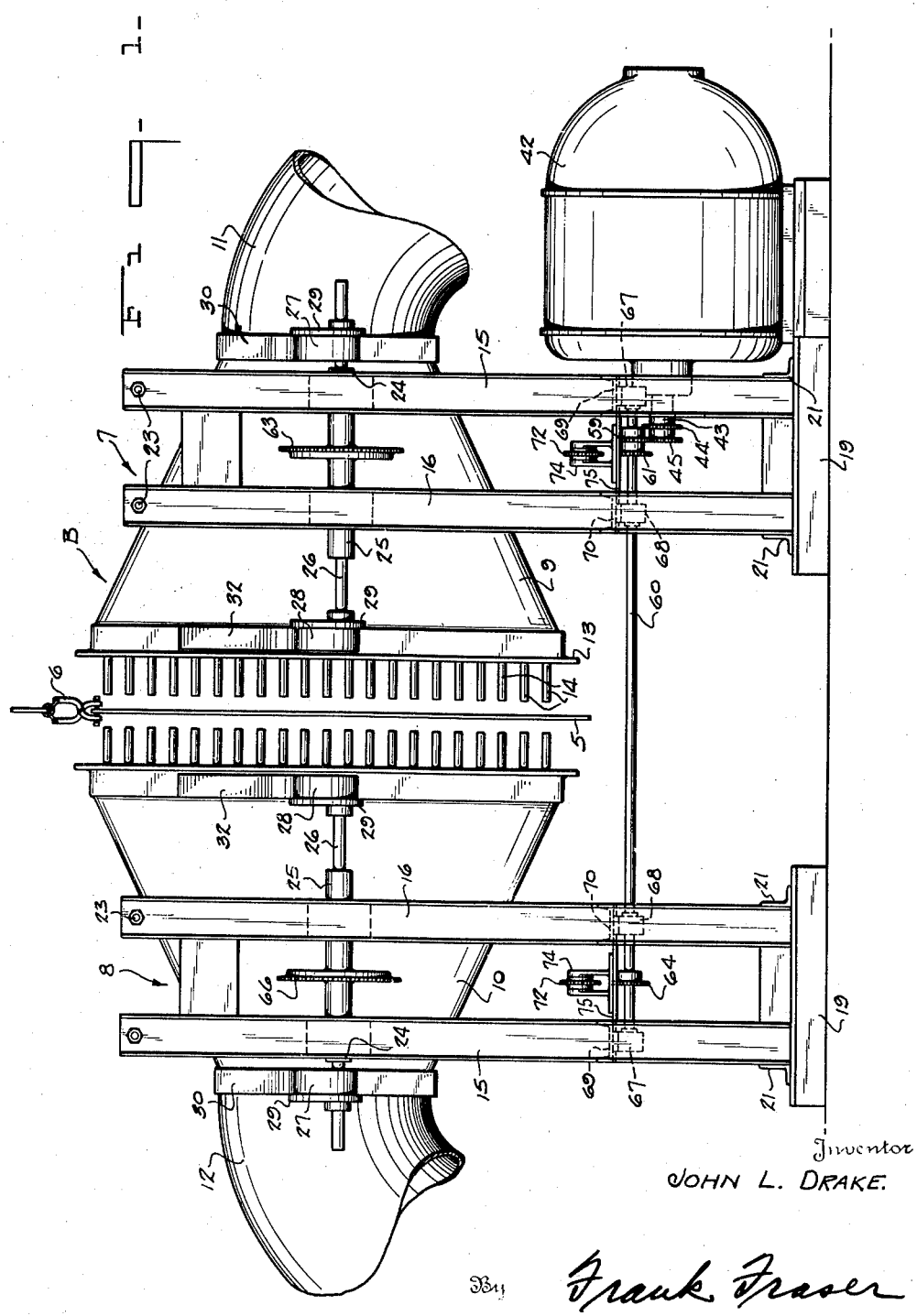

July 18, 1939. J. L. DRAKE 2,166,427
APPARATUS FOR TEMPERING GLASS
Filed Nov. 4, 1935 3 Sheets-Sheet 1

Inventor
JOHN L. DRAKE.
By Frank Fraser
Attorney

July 18, 1939.  J. L. DRAKE  2,166,427
APPARATUS FOR TEMPERING GLASS
Filed Nov. 4, 1935  3 Sheets-Sheet 2

Inventor
JOHN L. DRAKE.
By Frank Fraser
Attorney

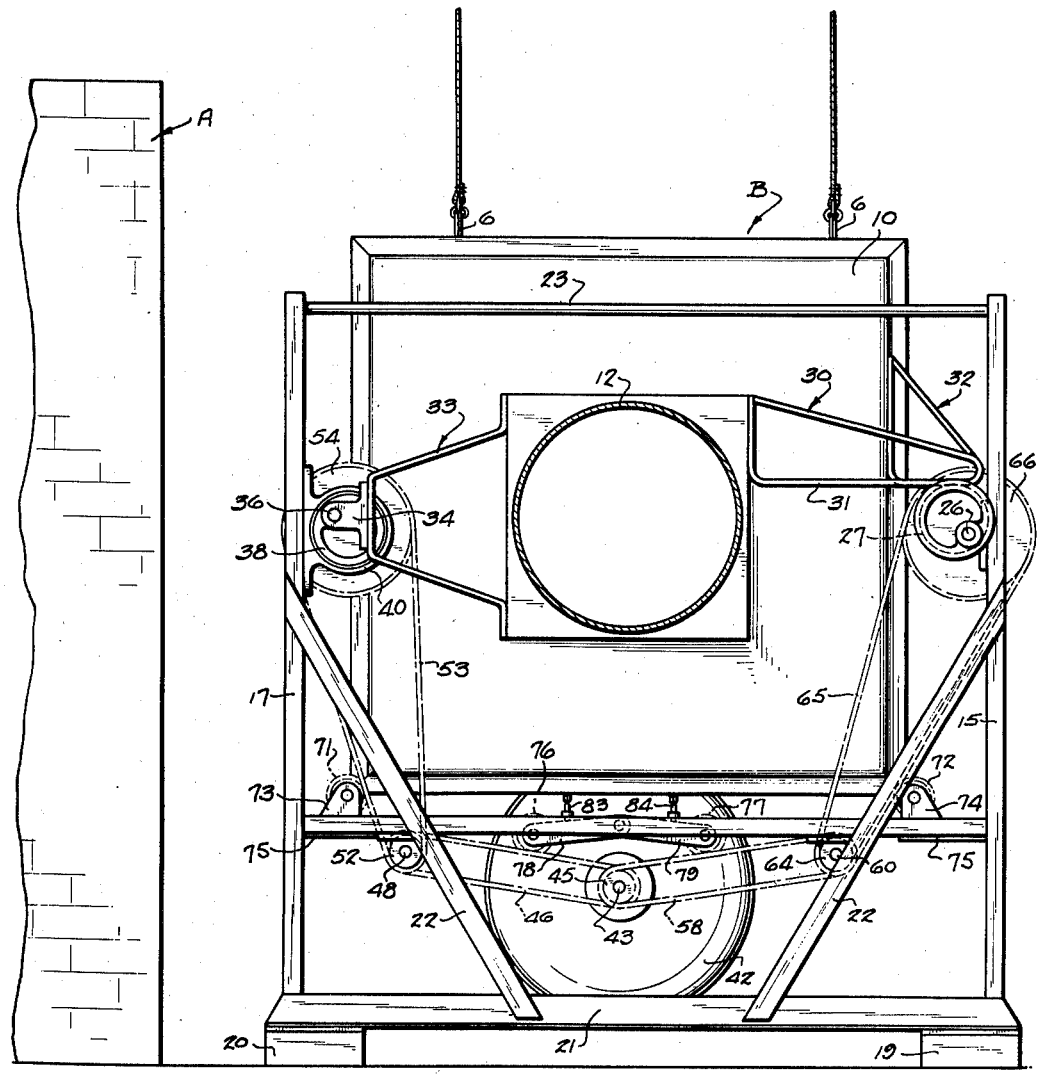
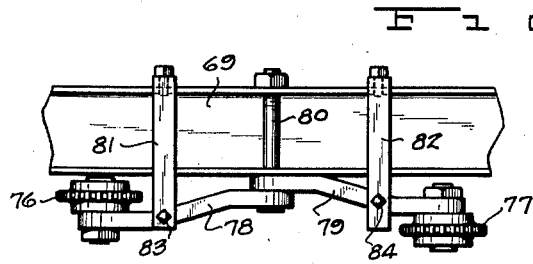
Fig. 3.
Fig. 4.
Inventor
JOHN L. DRAKE.

Patented July 18, 1939

2,166,427

UNITED STATES PATENT OFFICE 2,166,427

APPARATUS FOR TEMPERING GLASS

John L. Drake, Toledo, Ohio, assignor to Libbey-Owens-Ford Glass Company, Toledo, Ohio, a corporation of Ohio Application November 4, 1935, Serial No. 48,187

4 Claims. (Cl. 49—45)

The present invention relates broadly to tempering apparatus and more particularly to improvements in apparatus for use in the tempering of glass sheets or plates according to the well known process wherein the sheets are first heated to approximately the point of softening of the glass and then suddenly chilled to place the outer surfaces of said sheets under compression and the interiors thereof under tension.

The treatment of glass sheets in this manner not only materially increases the mechanical strength of the glass but further modifies its breaking characteristics in that when broken the glass sheet will disintegrate into innumerable small and relatively harmless particles instead of breaking into large dangerous pieces or slivers as is the case with ordinary glass.

In the tempering of glass sheets by the above process, the sheet is ordinarily maintained in a vertical position during the treatment thereof, and it is customary to suspend the sheet from a plurality of relatively small tongs or hooks engaging the same near its upper edge. The glass sheet is first heated to the desired temperature within a suitable furnace and upon removal therefrom is subjected immediately to the action of suitable cooling means by which the glass is suddenly chilled. The cooling means usually employed includes spaced cooling units provided with blower heads between which the highly heated glass sheet is received, said blower heads serving to direct jets of air upon opposite faces of the sheet simultaneously. These blower heads are preferably mounted for oscillatory movement in the plane of the glass sheet to effect a more uniform distribution of the air over the surfaces thereof and in consequence a more uniform cooling of the glass.

This invention concerns broadly the improvement of the cooling means and has for an object the provision of novel means for mounting the blower heads and for effecting the oscillatory movement thereof whereby to insure an even and uniform treatment of opposite surfaces of the glass sheet.

Another object of the invention is the provision of improved means for mounting and driving the blower heads to effect a smooth, uniform oscillatory movement thereof in a manner to minimize strain on the various parts of the apparatus, lessen uneven wear thereon, and prevent binding thereof.

Other objects and advantages of the invention will become more apparent during the course of the following description when taken in connection with the accompanying drawings.

Figure 2:
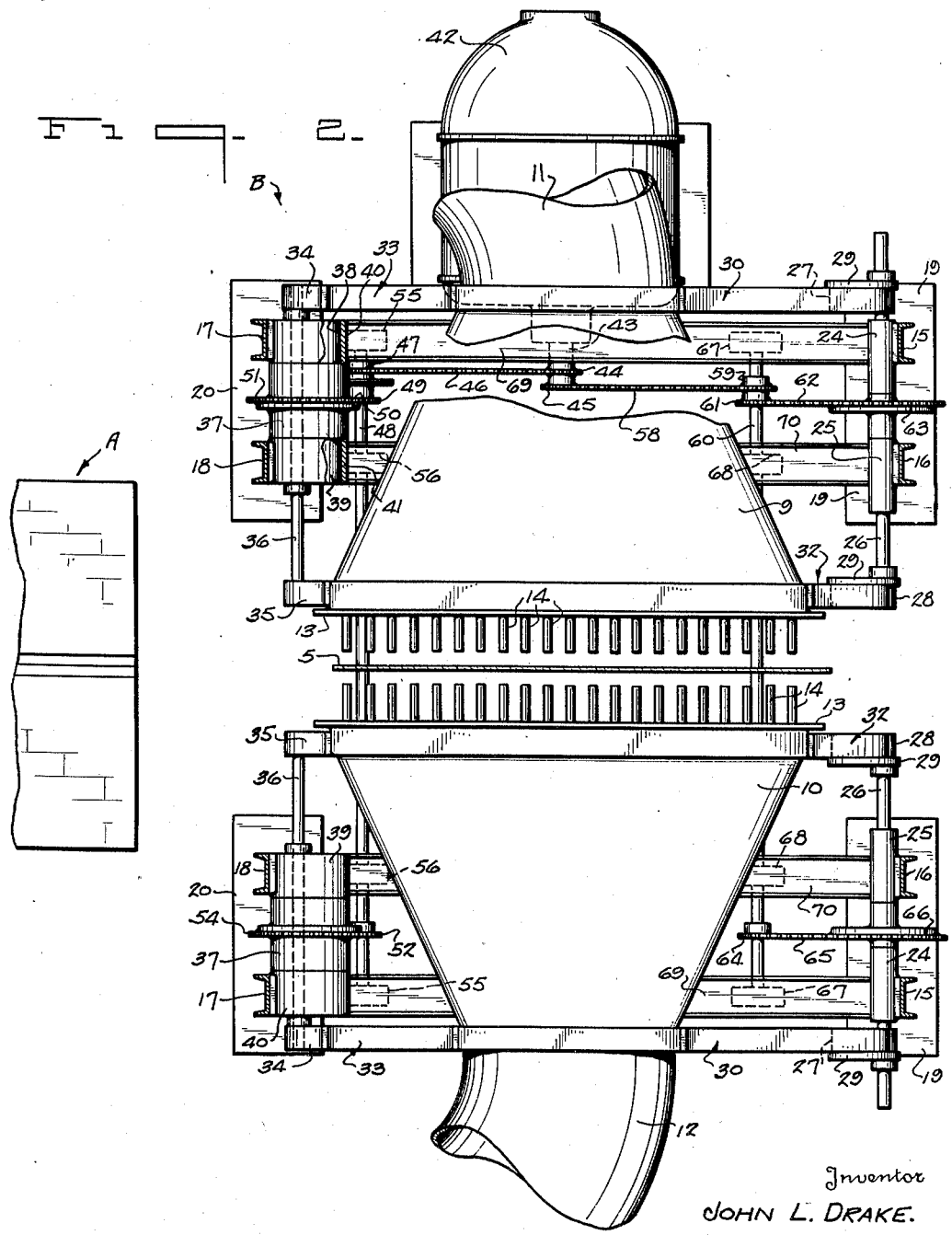

In the drawings wherein like numerals are employed to designate like parts throughout the same, Fig. 1 is a side elevation of cooling apparatus constructed in accordance with the present invention, Fig. 2 is a plan view thereof, Fig. 3 is a rear elevation of one of the cooling units, and Fig. 4 is a detail plan view of the chain tightening means.

As brought out above, in the practice of one well known process for tempering glass sheets, the sheets are first heated to approximately the point of softening of the glass and then suddenly chilled to place the outer surfaces of the sheets under compression and the interiors thereof under tension.

In the embodiment illustrated in the drawings, the means for heating the glass sheets comprises a horizontal furnace A while the means for cooling or chilling the same, and which constitutes the present invention, is designated in its entirety by the letter B, said cooling means being positioned adjacent the outlet end of the furnace A so that the glass sheets, after being heated within said furnace, can be transferred directly to the cooling means without any undue loss of heat and without being adversely affected by atmospheric conditions during the transfer.

The furnace A may be of any suitable construction but is preferably of the type wherein the glass sheets are introduced into one end thereof and then passed slowly therethrough to the exit end. The furnace may be electrically heated and by means of any conventional indicating and control mechanism, the temperature therein can be regulated to heat the glass sheets as they are carried therethrough to approximately their point of softening which is ordinarily in the neighborhood of 1250 degrees F. for flat glass. One of the glass sheets is shown at 5 and can be suspended within the furnace from a plurality of relatively small tongs 6 engaging the said sheet near its upper edge.

When the glass sheet has been heated to the desired temperature within the furnace, it is removed therefrom and subjected immediately to the action of the cooling means B which includes the spaced cooling units 7 and 8. The two cooling units 7 and 8 comprise oppositely disposed blower heads 9 and 10 respectively connected by flexible conduits 11 and 12 to suitable blowers (not shown) so that blasts of air can be directed simultaneously upon opposite surfaces of the glass sheet 5 when it is brought into position between the said blower heads. The inner end of each blower head may be closed by a plate 13 provided with a plurality of nipples 14 through which jets of air are directed against the sheet.

Each blower head 9 and 10 is mounted for oscillatory movement in the plane of the glass sheet upon a suitable framework including the two spaced vertical channel members 15 and 16 disposed at one side of the blower head and the two similar channel members 17 and 18 arranged at the opposite side of said blower head, the channel members 15 and 16 being supported upon a base 19 while the channel members 17 and 18 are supported upon a base 20. The supporting framework may be strengthened in any suitable manner such as by means of the angle beams 21 and braces 22. The opposed vertical channel members 15—17 and 16—18 may also be tied together at their upper ends by tie rods 23.

Carried by the vertical channel members 15 and 16 of each supporting framework adjacent the upper ends thereof are the horizontally aligned bearings 24 and 25 respectively within which is rotatably mounted a horizontal shaft 26, said shaft projecting at its opposite ends beyond the bearings 24 and 25 and having keyed to one end thereof a cam 27 and to its opposite end a similar cam 28. Each of these cams consists of a circular member or ring eccentrically mounted upon the shaft 26 and formed with a continuous flange 29 at the outer edge thereof. Carried by the blower head adjacent the rear end thereof is a bracket 30 having a horizontal portion 31 freely supported upon the peripheral edge of the circular cam 27 inwardly of flange 29, while also secured to the blower head adjacent the forward end thereof is a relatively smaller bracket 32 freely supported upon the peripheral edge of circular cam 28 outwardly of flange 29.

Secured at the opposite side of each blower head 9 and 10 adjacent the rear end thereof is a bracket member 33 carrying at its outer end a bearing block 34, while secured to the blower head adjacent the forward end thereof is a bearing block 35 similar to and positioned in horizontal alignment with bearing block 34. Extending between and loosely mounted in the bearing blocks 34 and 35 is a horizontal shaft 36 upon which is mounted an eccentric 37 having reduced end portions 38 and 39 which are rotatably mounted in the straps 40 and 41 respectively secured to the vertical channel members 17 and 18 adjacent their upper ends.

With such a construction as described above, it will be apparent that upon positive rotation of the eccentric 37, an oscillating or backward and forward motion will be imparted to the blower head. During the oscillating movement of the blower head, the brackets 30 and 32 will be freely supported upon the circular cams 27 and 28 which are also adapted to be positively driven so that the blower head is positively driven from one side only while the opposite side is supported for free floating movement. The circular cams 27 and 28 and eccentric 37 of each blower head are of the same size and so related that the opposite sides of the blower head are raised and lowered simultaneously.

The eccentric 37 of each blower head as well as the circular cams 27 and 28 are positively driven and synchronized in such a manner that they are always maintained in the same relative position. Likewise, the two blower heads 9 and 10 are adapted to be oscillated in unison from a common drive means to effect equal treatment of opposite faces of the sheet. To this end, there is provided a single drive motor 42, the shaft 43 of which carries two sprockets 44 and 45. Trained about sprocket 44 is a chain 46 also trained about a sprocket 47 keyed to a horizontal shaft 48. Also keyed to the shaft 48 is a second sprocket 49 about which is trained a chain 50 also trained about a sprocket 51 keyed to the eccentric 37 of blower head 9.

The shaft 48 extends transversely between the two blower heads 9 and 10 and is also operatively connected with the eccentric 37 of blower head 10. Thus, this shaft carries adjacent its opposite end a sprocket 52 about which is trained a chain 53 also trained about a sprocket 54 carried by the eccentric 37 of blower head 10. In this way it will be seen that upon rotation of shaft 48, the two eccentrics 37 will be simultaneously driven to cause the blower heads 9 and 10 to oscillate in unison. The shaft 48 is supported at each end in spaced bearings 55 and 56 carried by horizontal channel members 69 and 70 respectively which extend between and are secured to the vertical channel members 15—17 and 16—18.

Trained about the sprocket 45 keyed to motor shaft 43 is a chain 58 also trained about a sprocket 59 carried by a horizontal shaft 60 extending parallel with shaft 48. This shaft 60 carries a second sprocket 61 about which is trained a chain 62 also trained about a sprocket 63 keyed to the horizontal shaft 26 of the blower head 9. The shaft 60 also extends transversely between the cooling units and is operatively connected with the shaft 26 of blower head 10. This is effected by a sprocket 64 keyed to said shaft and about which is trained a chain 65 also trained about a sprocket 66 keyed to the shaft 26 of blower head 10. The shaft 60 is supported at each end in spaced bearings 67 and 68 carried by the horizontal channel members 69 and 70 respectively. Upon rotation of shaft 60, the two shafts 26 of the two cooling units will be simultaneously driven to effect rotation of the circular cams 27 and 28.

The sprocket chains 53 and 65 of cooling unit 8 may be maintained taut, as shown in Fig. 3, by sprockets 71 and 72 respectively, which act as chain tighteners, said sprockets being carried by brackets 73 and 74 mounted upon the supporting framework. Similar sprockets may also be associated with the sprocket chains 50 and 62 of cooling unit 7.

The sprocket chains 46 and 58 may also be maintained tight by sprockets 76 and 77 (Fig. 4) rotatably mounted at the outer ends of arms 78 and 79 respectively pivoted at their inner ends upon a horizontal bolt 80 carried by horizontal channel member 69. Also carried by the channel member 69 are the transversely arranged strips 81 and 82 through which are threaded vertical screws 83 and 84 respectively which engage the arms 78 and 79 to urge them downwardly and the sprockets 76 and 77 carried thereby into engagement with the sprocket chains 46 and 58.

Heretofore, it has been customary to drive the blower heads from both sides thereof, but such an arrangement has not proven entirely satisfactory due, among other reasons, to the fact that it was difficult to maintain the two drives equal and balanced at all times. For instance, when one drive operated slightly faster or slower than the other, the two drives would in effect be pulling against one another, with the result that a decided strain was placed upon various parts of the apparatus causing binding and uneven wear. Furthermore, the unbalanced drives would tend to set up vibrations in the apparatus and prevent the blower heads from oscillating smoothly and uniformly. Moreover, when driving the blower heads from both sides thereof, a uniform and exact throw of the cranks would have to be maintained as well as exact timing. However, by positively driving the blower head from one side only while the opposite side thereof is freely supported, as disclosed herein, the above objectionable features are eliminated, as a result of which a smooth uniform oscillatory movement of the blower heads is obtained.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the tempering of glass sheets wherein the sheet is first heated to substantially the softening point of the glass and then suddenly cooled, means for cooling the sheet including spaced blower heads for receiving the heated glass sheet therebetween and being oscillatable in the plane of said sheet, means for driving each blower head including an eccentric for supporting the said head at one side thereof, and a rotatable cam for freely supporting the said blower head at its opposite side.

2. In apparatus for use in the tempering of glass sheets wherein the sheet is first heated to substantially the softening point of the glass and then suddenly cooled, means for cooling the sheet including spaced blower heads for receiving the heated glass sheet therebetween and being oscillatable in the plane of said sheet, means for driving each blower head including an eccentric for supporting the said head at one side thereof, a rotatable cam for freely supporting the said blower head at its opposite side, and a common drive means for said eccentric and cam.

3. In apparatus for use in the tempering of glass sheets wherein the sheet is first heated to substantially the softening point of the glass and then suddenly cooled, means for cooling the sheet including spaced blower heads for receiving the heated glass sheet therebetween and being oscillatable in the plane of said sheet, means for driving each blower head including an eccentric for supporting the said heat at one side thereof, a rotatable cam for freely supporting the said blower head at its opposite side, a motor, and operative drive connections between said motor and the eccentric and cam of each blower head.

4. In apparatus for use in the tempering of glass sheets wherein the sheet is first heated to substantially the softening point of the glass and then suddenly cooled, means for cooling the sheet including spaced blower heads for reeciving the heated glass sheet therebetween and being oscillatable in the plane of said sheet, means for supporting each blower head at one side thereof including an eccentric, means for supporting said blower head at its opposite side including a horizontal shaft, a ring-like cam member eccentrically mounted upon said shaft and means carried by said blower head and freely supported upon the peripheral edge of said cam for supporting the respective side of the said blower head for free floating movement, and means for driving said eccentric and cam.

JOHN L. DRAKE.